UNITED STATES PATENT OFFICE.

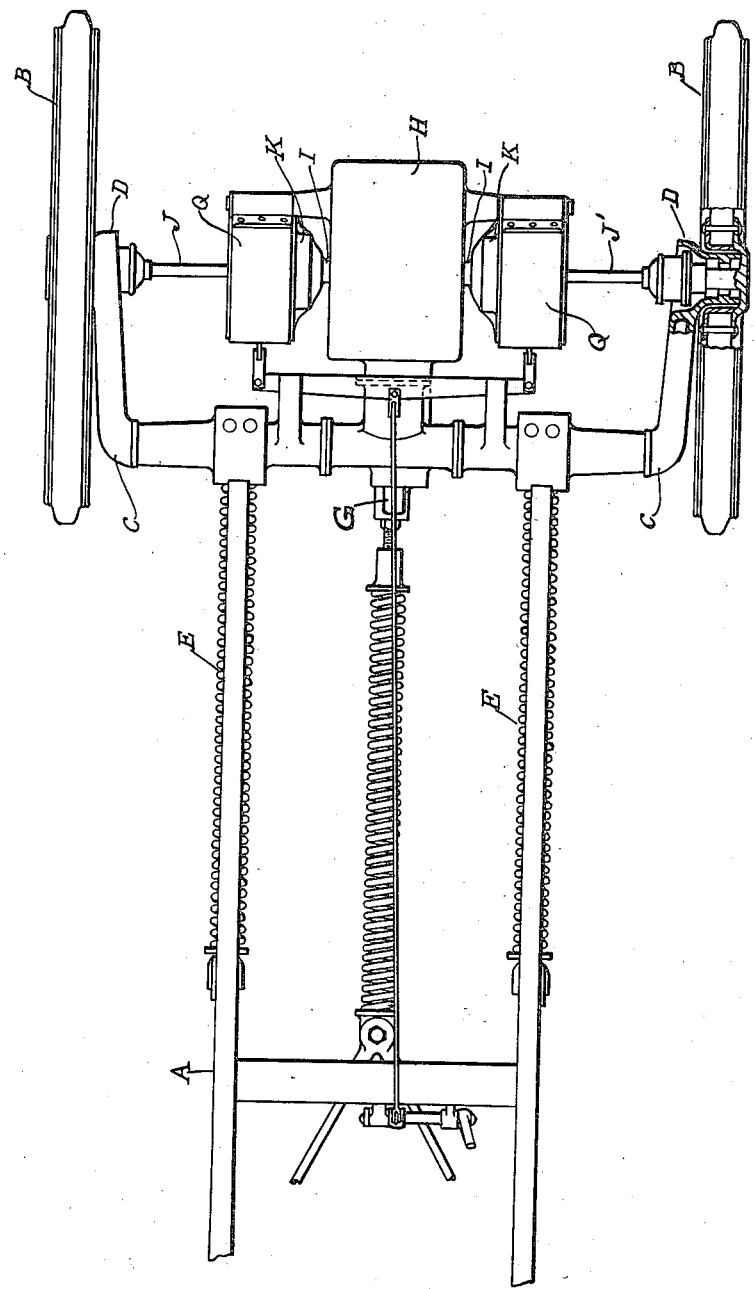

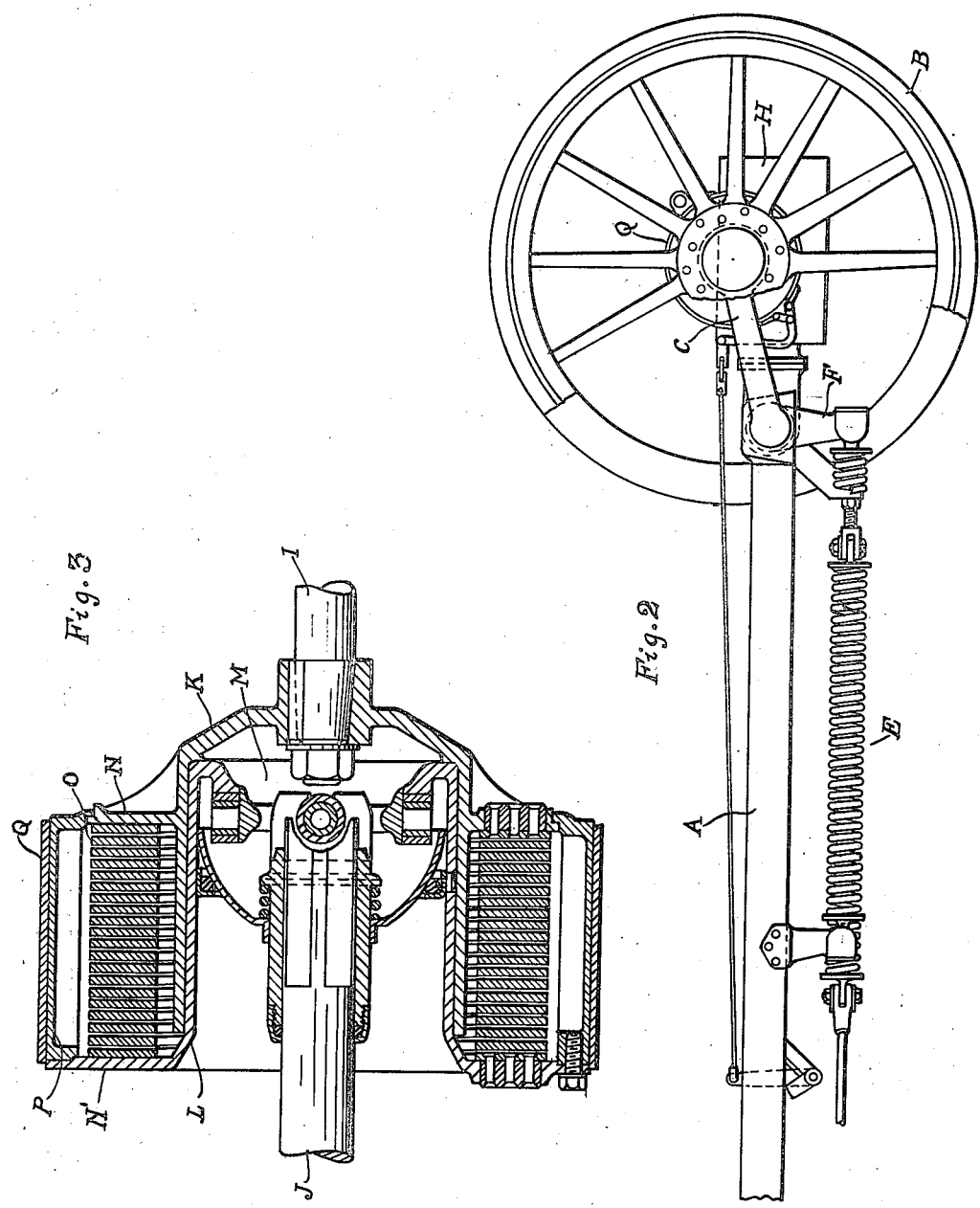

WILLIAM E. BOCK, OF TOLEDO, OHIO.

MOTOR-VEHICLE.

1,311,591.   Specification of Letters Patent.   Patented July 29, 1919.

Application filed July 11, 1913. Serial No. 778,494.

*To all whom it may concern:*

Be it known that I, WILLIAM EMIL BOCK, a citizen of the United States of America, residing at Toledo, in the county of Lucas and State of Ohio, have invented certain new and useful Improvements in Motor-Vehicles, of which the following is a specification, reference being had therein to the accompanying drawings.
The invention relates to motor vehicles of that type in which the drive wheels are independently, vertically yieldable in relation to the frame supported thereon. It is one of the objects of the invention to provide a drive mechanism for the vehicle in which the friction clutch usually employed is dispensed with and at the same time one making provision for yielding when the load is applied. It is a further object to provide a positive brake mechanism for arresting rotation of the wheels, which will permit their independent vertical adjustment, and will not interfere with the yieldable drive connection between the same and the motor.

In the drawings:

Figure 1 is a diagrammatic plan view of the motor vehicle;

Fig. 2 is a side elevation thereof; and

Fig. 3 is a vertical cross section therethrough.

A is the vehicle frame, and B are the drive wheels. C are rock arms pivoted to the frame and carrying stub axles D on which the wheels B are mounted. E are yieldable springs engaging bell crank arms F for each of the rock arms C and constituting a resilient support for the frame thereon. G is a transmission shaft extending longitudinally of the frame. H is a gearing connecting the shaft G with a transverse shaft I, and J and J' are flexible shaft connections between the shaft I and stub axles D. The arrangement as thus far described is such that the power from the shaft G and from the engine or other motor (not shown) for driving the same, is transmitted through the gearing H, shaft I and flexible shafts J and J' to the drive wheels B, while at the same time each of these wheels is permitted to rise or fall independently of the other and of the frame, by the rockable supporting arm C and yieldable springs E.

The gearing H forms a variable speed transmission between the shafts G and I, being preferably of the worm gear type, the specific construction of which forms no part of the present invention. With this type of gearing variable speeds are transmitted by the shifting in of worms of different pitch, but no provision is made for slippage between the parts and there is no necessity for a friction clutch. As a result the engagement of the gears would at once throw on the load, which would be detrimental as tending either to stop the engine or to strip the gears. Such a result I have avoided by placing intermediate the gearing H and the drive wheels B, a rotatively yieldable connection. On the other hand, the stopping of the wheels is effected by a brake mechanism and it is desirable to mount this in fixed relation to the frame and in rotatively fixed relation to the wheels. I have therefore provided a construction intermediate the shaft I and wheels B, which performs the function of a brake and a yieldable member in the drive, the braking rim being rotatively fixed with the wheels and in axially fixed relation to the frame.

In detail, K is a cylindrical casing member mounted at the end of the shaft I and surrounding the flexible shaft J. L is another cylindrical drum member rotatively mounted in the member K and forming one member of a universal coupling M and the other member of which is directly attached to the shaft J. The members K and L are provided with parallel outwardly-extending flanges N and N', between which is arranged a spiral spring O, yieldably permitting the relative rotation of the drums K and L. The flange N' which is attached to the drum L is also attached to an outer drum P, which constitutes the brake drum for the mechanism and which is engaged by the brake strap Q.

With the construction as described, whenever power is transmitted through the shaft G and the gearing H to the shaft I, it will cause the rotation of the drum K, and through the medium of the spiral spring O will also cause the rotation of the drums L and P. The connection is not, however, a rigid one, as the spring O is free to wind about the drums and thus the load is not suddenly placed upon the driving mechanism.

To stop the vehicle, the brake Q is applied to the drum P, and as the latter is connected to the flange N' and thereby to the drum L, which in turn is connected through the universal coupling M to the flexible shaft J, all of said parts will be rotatively fixed in relation to the wheel B. Consequently the application of the brake will be positive, while the application of the power from the shaft G will be yielding.

The operation of the power transmission and also the operation of the brake may be accomplished without reference to the position of the wheel B in relation to the vehicle frame. The relative positions of these parts will be constantly changing when the vehicle is in motion due to the yielding of the spring E and the rocking of the arms C but the universal coupling M and flexible shaft J will permit such relative movement of the frame and wheel without in any way interfering with either the power transmission or the application of the brake.

What I claim as my invention is:

1. In a motor vehicle, the combination with a frame, of a drive shaft extending longitudinally thereof, drive wheels upon opposite sides of said frame, independently yieldable connections between said drive wheels and frame, alined rotary members having an axis transverse to said frame and in fixed relation thereto, non-yielding torque connections between said drive wheels and the respective rotary members, a brake applied to each of said rotary members, a transmission mechanism driven by said longitudinal shaft, and yieldable torque connections between said transmission mechanism and each of said rotary members.

2. In a motor vehicle, the combination with a frame, of drive wheels upon opposite sides of said frame, independently yieldable resilient connections between said drive wheels and frame, a differential drive gearing for said wheels mounted in fixed relation to said frame, rotary members also in fixed relation to said frame having a yieldable torque connection with said differential gearing, a brake engaging each of said rotary members and a non-yielding torque connection between each of said rotary members and its respective drive wheel.

3. In a motor vehicle, the combination with a frame, of a wheel upon which said frame is yieldably supported, a drive mechanism upon said frame, a flexible shaft forming a non-yielding torque connection with said wheel, a cylindrical member axially fixed in relation to said frame and connected to said drive mechanism, a cylindrical drum member rotatively mounted in said cylindrical member and forming one member of a universal coupling, a member directly secured to said non-yielding torque connection forming the other member of the universal joint, a yieldable connection between said cylindrical members and braking means adapted to be applied to said cylindrical drum member.

In testimony whereof I affix my signature in presence of two witnesses.

WILLIAM E. BOCK.

Witnesses:
H. L. BOCK,
W. E. CRABBS.